ANTENNA ROTATING AND/OR TUNING APPARATUS

Filed May 10, 1950 2 SHEETS—SHEET 1

Inventor
Oscar H. Dicke

June 3, 1952

O. H. DICKE 2,599,048

ANTENNA ROTATING AND/OR TUNING APPARATUS

Filed May 10, 1950

2 SHEETS—SHEET 2

Inventor

Oscar H. Dicke

Patented June 3, 1952 2,599,048

UNITED STATES PATENT OFFICE 2,599,048

ANTENNA ROTATING AND/OR TUNING APPARATUS

Oscar H. Dicke, New Bremen, Ohio

Application May 10, 1950, Serial No. 161,151

16 Claims. (Cl. 343—100)

This invention relates to television and other uultra-high frequency broadcasting systems and more particularly to means for, by remote control, rotating and/or tuning the antenna of a receiver with respect to the transmitting station to which the receiving set is tuned.

The carrier frequency for television and frequency modulation radio transmission is so high that substantially straight-line or sight-line transmission is relied upon. At these high frequencies reflection and interference are much more annoying. In order to reduce interference and increase the volume of reception directional, adjustable antennas are preferably used, that is, the more nearly the antenna is tuned to the wave length to be received and the more nearly the axis of maximum reception of such antenna points to the transmitter with which communication is to be established the more efficient the channel of transmission will be.

In view of the foregoing and other important considerations it is proposed in accordance with the present invention to provide power operated means near the antenna which is controlled from a point near or in the television or radio set which may operate the antenna to any one of a plurality of positions about the compass each position of which is adjustable to any specific point about the compass.

It is further proposed to use different or like structure as above disclosed to tune an antenna to any one of the various carrier frequencies used in the transmission of the ultra-high frequency radio.

It is further proposed in accordance with one form of the present invention to use a single controller for controlling two motors, one of which will rotate the antenna to the proper position about the compass and the other of which will tune the antenna to the frequency of the transmitting station to which the antenna has been caused to point by the first mentioned motor.

In accordance with another embodiment of the present invention it is proposed to use the hand operated tuning devices (usually push-buttons) of the ultra-high frequency radio receiver to complete the proper circuit of the remote controlled apparatus to cause the antenna to be tuned and rotated to conform with the transmitter to which the television set itself has been tuned.

In accordance with other forms of the invention the remote controlled means may either direct or tune the antenna and the control may be carried out by either separate manually controlled devices or by the tuning controllers of the ultra-high frequency radio receiving set itself.

More specifically the remote controlled device comprises a reversible motor and a plurality of contact mechanisms which are each adjustable to stop the motor at the correct point in rotating and/or tuning the antenna and so constructed that the motor will be operated forwardly or backwardly whichever is necessary depending on the position then assumed by the antenna and/or its tuner when the apparatus was controlled to assume a new rotated or tuned position.

Other objects, purposes and characteristic features of the invention will become apparent as the description of the invention progresses when considered in the light of the accompanying drawings in which.

Figures 1, 2, 10:
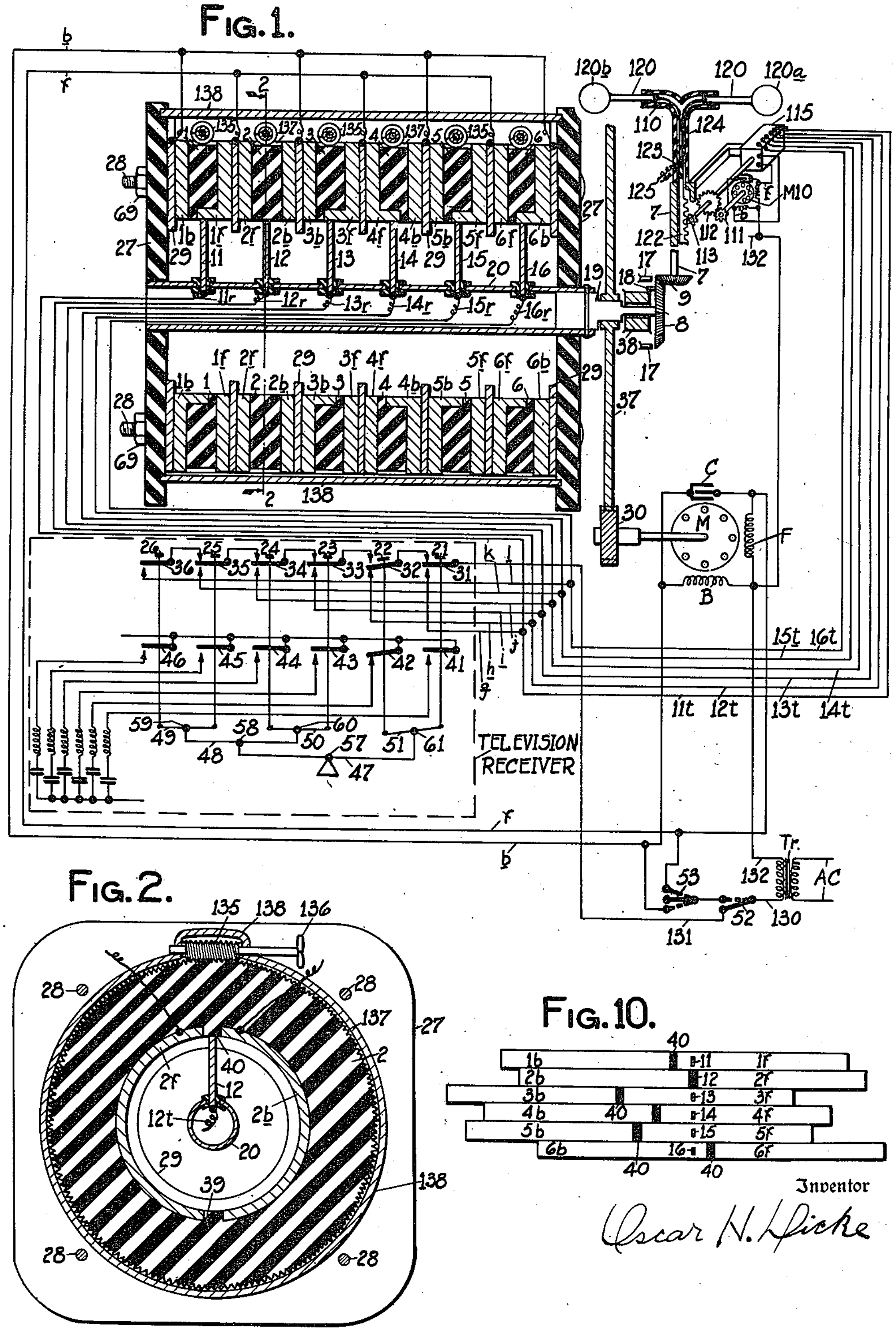
Fig. 1 illustrates conventionally apparatus of the present invention controlled by the push or turn tuning buttons of a television or frequency modulation receiving set, for rotating and/or tuning an antenna; control wires extending to a second motor shown.
Fig. 2 illustrates a sectional elevation taken on the line 2—2 of Fig. 1; shows how contact drums may be adjusted from the outside of the casing while the apparatus is being controlled.
Figures 8, 9:
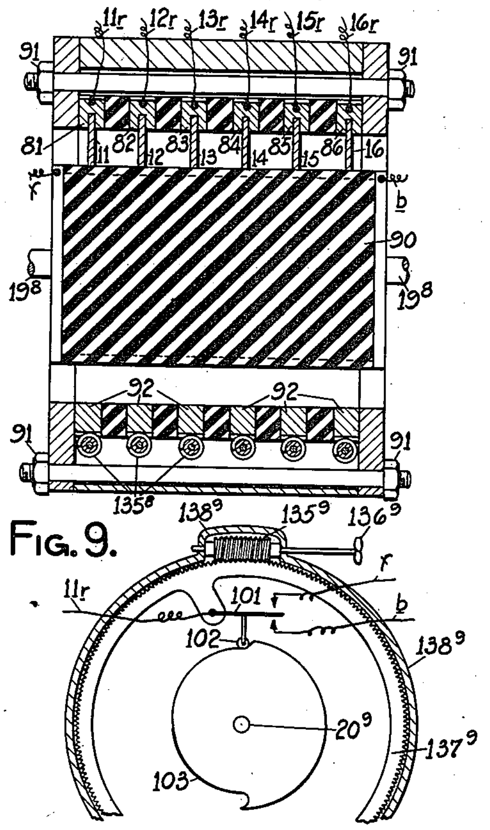
Figure 3:
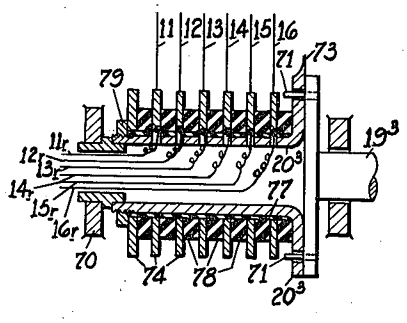
Fig. 3 illustrates a fragmentary portion of a modified form of the invention in which the contact brushes are adjustable and the contact drums are non-adjustable, whereas in Fig. 1 the contact drums are adjustable and the contact brushes are relatively fixed, although the contact brushes are shown rotatable the contact drum may be made rotatable as in the Fig. 5 and Fig. 7 construction.

Fig. 8 illustrates a fragmentary portion of still another form of the invention wherein the brushes are adjustable about 180° of circumference the same as in the Fig. 3 construction but wherein the brushes contact with the exterior surface of a single commutator whereas in Fig. 3 they contact the inner surfaces of a commutator (not shown in Fig. 3 but see Fig. 1), in this Fig. 8 form the commutator or contact drum may be rotated a fraction of one revolution by the motor and reduction gearing and the rings supporting the brushes are adjustable from the outside of the casing;

Fig. 9 illustrates a modified form of contact structure which may be used in any one of the forms of invention illustrated in Figs. 1, 3, 5, 6, 7 and 8 wherein a two-radius cam engaging a roller carrying a contact which may close a forward circuit *f*, a backward circuit *b* or may leave both of these circuits open which contact carrying rollers are adjustable from the outside of the casing; and Fig. 10 shows conventionally the six contact drums of Fig. 1 in a developed flattened out view and adjusted to various positions.

*Structure Fig. 1.*—In Fig. 1 have been illustrated six tuning buttons 21, 22, 23, 24, 25 and 26 of a television or frequency modulation receiver of which contacts 41, 42, 43, 44, 45 and 46 select six different tuning circuits each including an inductance and a condenser in series for tuning the receiver itself to any one of six different carrier frequencies. If desired any other form of tuner such as a viariable condenser and as many as 11 or 13 different tuning channels may be provided. These six push or turn buttons are preferably interlocked, as by floating levers 47, 48, 49, 50 and 51 fulcrumed at 57, 58, 59, 60 and 61 respectively, and with the ends of the levers 49, 50 and 51 engaging these push buttons with sufficient lost motion so that five buttons will assume the raised position and only one can assume the depressed position at any one time. By this construction only one carrier frequency can be tuned in at any one time in the receiving set and only one control circuit for the antenna rotator and/or tuner may be closed at one time. Also, if desired, a multi-step rotatable tuner in the radio set having a multi-step circuit closer closing a different control circuit on each tuning step may be used. The contacts 31, 32, 33, 34, 35 and 36 on these push buttons serve to select wires *g*, *h*, *i*, *j*, *k* and *l* leading to wires 11*r*, 12*r*, 13*r*, 14*r*, 15*r* and 16*r* leading to brushes 11, 12, 13, 14, 15 and 16 of the antenna rotator and to wires 11*t*, 12*t*, 13*t*, 14*t*, 15*t* and 16*t* leading to corresponding contact brushes of an antenna tuner including motor M10 and also including gearing and contact structure such as shown in detail for rotating the dipole antenna 120 which motor M10 is used for tuning such antenna. It should be observed that the contacts 31, 32, 33, 34, 35 and 36 are so electrically interlocked that only one of the wires *g*, *h*, *i*, *j*, *k* and *l* can have current applied thereto at any one time. In other words, both mechanical and electrical interlocking, to prevent the selection of more than one position by the antenna rotator or antenna tuner at any one time, is provided. Each of the six contact drums 1, 2, 3, 4, 5 and 6 comprise a ring of insulation (see Fig. 2) shown in radial section in Fig. 1 which has two semi-circular band sections 2*f* and 2*b* for drum 2 (Fig. 2) each band section having a flange extending the full length around the circuit, one on one end of the insulation drum and the other on the other end thereof as shown in Fig. 1. These bands are insulated from each other by insulations 39 and 40 (Fig. 2) and one, such as band 2*f*, is connected to the forward wire *f* connected to the forward winding F of the motor M and the other such as band 2*b* is connected to the backward wire *b* connected to the backward winding B of the motor M. These connections are made through contact washers 29 clearly shown in Fig. 1 of the drawings. These washers and flanges are preferably very smooth so that these drums may be individually adjusted rotatably about the shaft 20 by the worms 135 (see Figs. 1 and 2) engaging worm threads cut into the periphery of the drums 1, 2, 3, 4, 5 and 6 so that these contact drums may be individually rotated through an arc of at least 180°, so that the insulation portions 40, one for each drum, may be adjusted to individual positions but all falling within an arc of 180° (see Fig. 10) about the shaft 20 supporting the brushes 11, 12, 13, 14, 15 and 16. In this connection it should be noted that the gear ratio of bevel pinions 8 and 9 is 2 to 1 so that shaft 20 may rotate through 180° as permitted by stops 17 and 18 while antenna mast 7 and dipole antenna 120 may rotate 360° or entirely about the points of a compass.

As shown the motor M, which is preferably a reversible condenser type split phase induction motor, through pinion 39 and gear 37 drives the hollow shaft 20 of the adjustable multi-commutator 1—6 and also through stub-shaft 18 drives the bevel gear 8 which through bevel gear 9 drives the antenna mast 7 supporting antenna A. This motor M includes a condenser C which, if wire *f* is energized is included in series with the winding B and if the wire *b* is energized is included in series with the winding F, from which it is readily seen that the motor runs forward when wire *f* is energized and runs backward when the wire *b* is energized. As already pointed out the six contact drums 1, 2, 3, 4, 5 and 6 are each provided with two flanges which have been designated by the same reference character as the band portion of conducting material of which they form a part. Thus drum 2 is provided with band portions 2*b* and 2*f* (see Fig. 2) which have flanges of conducting material 2*b* and 2*f* respectively extending the entire 360° around the ring as shown in Fig. 1. In order to make ready connections to forward wire *f* and backward wire *b* a washer 29 of conducting material is provided between adjacent drums and at each end of the drum assembly. The conducting flanges and the washers 29 are preferably very smooth so that each drum may be adjusted with its insulation 40 (see Fig. 2) located at the proper radial position when such position is known by the reason of the fact that it is known where the apparatus is to be located with respect to the various television broadcasting stations which are to be tuned in. These various adjustments may be made by turning the winged head 136 constituting the end of the shaft containing worm 135. It should be observed that the apparatus is shown in Figs. 1, 2 and 10 assuming the "2" position where brush 12 engages insulation 40. This is due to the fact that push button 22 has been depressed causing current to be applied to wires *h*, 12*r* and 12*t*. The flow of current through wire 12*r* through either the wire *f* or *b* caused the motor M to rotate until insulation 40 was engaged by the brush 12. The insulation 39 (not shown in Fig. 10 but see Fig. 2) is never engaged by brush 12, because the brush is in each case driven in a direction away from this insulation 39 and toward insulation 40. This is readily understood by studying Fig. 10. When all six contact drums 1, 2, 3, 4, 5 and 6 have been adjusted to their proper positions and let us assume that the station of contact drum 2 is directly north, then the stations of contact drums 1, 3, 4 and 5 are respectively 20°, 80°, 40° and 60° to the east of north and the station of contact drum 6 is 20° to the west of north as clearly shown in Fig. 10. In practicing the invention when the contact drums are adjusted as illustrated in Fig. 10, if the tuning button 21 were depressed energizing brush 19 the motor M would be operated forward as readily understood from Figs. 1 and 10 but if the push tuning button 26 were depressed energizing the brush 16 the motor M would be operated backward as also readily understood from Figs. 1 and 10. The motor M10 is controlled in exactly the same manner but its contact mechanisms are specially adjusted to bring about correct tuning of the antenna for each oriented position of the antenna.

In practice the order of tuning frequencies and the order of locations of the stations having such frequencies will in all probability be different, from which consideration it is apparent that the motor M (Fig. 1) and motor M10 (Fig. 1) will sometimes be operated in the same directions and will at other times be operated in opposite directions as the television or FM receiving set is switched from one transmitting station to another. This is readily understood when it is considered that the contact drums of the Fig. 1 structure are adjusted to locations of the stations about the compass whereas the contact drums of the motor M10 structure are adjusted in accordance with carrier frequencies of corresponding stations. It will also be understood that the insulation portions 40 of the six drums will all lie within an arc of 180° about shaft 20 as conventionally illustrated in Fig. 11. In other words, only one half of each commutator drum after once adjusted, is used. A portion of the other half of such drum is however used if the drum is later adjusted to another position. For this reason the gear ratio of bevel gears 8 and 9 has been made 2 to 1 so that each contact drum may be used for any station and all drums may be identical. The gear ratio of gears 8 and 9 could have been 1 to 1 if the contact drums were all fixedly located about shaft 20 in the manufacture and each drum were designed for one particular angular stopping position only, that is, with some drums having long contact bands 2f (Fig. 2) and short contact bands 2b whereas other contact drums would have short contact bands 2f and long contact bands 2b. In this case the apparatus would however not be adjustable in the field and such construction is not desirable and is not contemplated. In applicant's construction each contact band will be long enough for any situation and after adjustment only the portion necessary for that adjustment will be used (see Fig. 10). In this connection, if desired, the gear ratio of gears 8 and 9 may, for instance, be 21 to 10 instead 2 to 1 so that none of the brushes will under any condition engage insulation 39 (Fig. 2). As above mentioned high frequency radiation such as television carrier frequencies or FM frequencies are much more efficiently received if the antenna is designed for directional reception and is itself adjustable for tuning so that it may be tuned to the carrier frequency of the ultra-high frequency broadcasting station selected. Since it is in practice, desirable to tune in and receive television or FM radio information from a plurality of stations located in various directions, one at a time, when an adjustable tunable antenna is used, it is not only necessary to direct the antenna in the proper direction but it is also desirable to tune the antenna to the carrier frequency to be received. Accordingly it is proposed to direct the antenna 120 in the proper direction by apparatus such as shown in detail in Fig. 1 and to mount a similar motor M10 and associated apparatus shown in less detail on the antenna mast 7 (see Fig. 1) for tuning the dipole antenna 120 to the frequency to be received, as conventionally illustrated in Fig. 1.

In referring to Fig. 1 it will be seen that a double elbow of insulating material 110 is mounted on the mast 7 as is also mechanism of the motor operated antenna tuner including the motor M10, the gears 111, 112 and 113 and a contact mechanism housing 115. The two balled ends 120*a* and 120*b* of a dipole antenna 120 project in opposite horizontal directions from this double elbow 110. The pinion 113 engages the teeth of a rack 122, the insulated end of which is fastened to two metallic chains or metallic straps 123 and 124 the lower ends of which are electrically connected to a twisted pair of lead-in wires or coaxial cable 125 leading to the receiver. The free upper ends of these chains or metallic straps 123 and 124 are fastened to the inner ends of the two portions of antenna 120 having balls 120*a* and 120*b* at their outer ends. From this construction it is readily seen that as rack 122 is moved up and down the balls 120*a* and 120*b* are pushed farther apart and pulled closer together respectively, so as to tune the antenna to longer and shorter wave lengths respectively. The dipole antenna illustrated would receive efficiently from two directions 180° apart. It should however be understood that tuneable radio wave reflecting rods tuned by the same motor may be added and are to be considered present in the conventional showing illustrated, and this construction is efficient for one direction of reception only and any other form of tuneable directional antenna may be used within the scope of the present invention. The motor M10 is controlled through control wires 11*t*, 12*t*, 13*t*, 14*t*, 15*t* and 16*t*, fed by wires *g*, *h*, *i*, *j*, *k*, and *l* respectively through the medium of contact mechanism contained in box 115 of the same construction of the adjustable contact mechanism as motor M of Fig. 1 is constructed. The motor M10 may be controlled by the contact mechanisms disclosed in any one of Figs. 1, 3, 5, 6, 7, 8 and 9. It will be observed from Fig. 1 that the entire operating structure operated by motor M10 is supported by the antenna mast 7 so that the motor M of Fig. 1 is called upon to bodily move the entire antenna tuning mechanism including motor M10 about the axis of mast 7. Since the entire operating mechanism, including the contact mechanism contained in box 115 which determines the direction and extent of operation of motor M10 in each case when a different control wire 11*t*, 12*t*, 13*t*, 14*t*, 15*t* or 16*t* is energized, is the same as that already described, further description of the apparatus including motor M10 and the contact mechanism in box 115 is believed unnecessary. It may however be pointed out that the index of degrees for contact drum or contact brush adjustment such as pointed out in connection with Figs. 3 and 4 may be supplemented by a table indicating the relationship between actual degree measurement and tuning frequency cycles or wave length. This is in certain cases desirable in that there may not be exact linear relationship between increments of movement of rack 122 and increments of frequency of tuning of the antenna 120. Such a table is however not necessary if adjustments are made in the field so as to obtain the best reception. It should also be understood that the apparatuses driven by motors M and M10 are not necessarily used together, in that each of the two operating mechanisms may either be used alone or in combination with the other. It should also be understood that the push or turn buttons for rotating and/or tuning of the antenna may be separate from the tuning buttons of the television receiving set, so that the apparatus of the present invention may be adapted to television and FM sets already installed.

Figure 4:
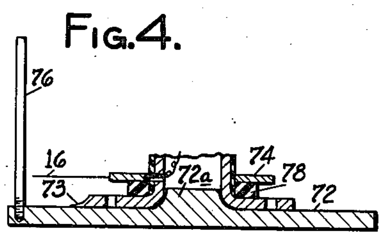
Fig. 4 illustrates a jig for accurately, by degree adjustment, adjusting the contact brushes shown in Fig. 3.

*Structure Figs. 3 and 4.*—In this form of the invention all structure, only partly shown, except the contact mechanism is identical to that shown in Fig. 1. In this Fig. 3 structure only a single but wide contact drum is used and instead of having the six contact brushes 11–16 all lined up as shown in Fig. 1 these brushes 11–16 are each fastened to a rotatably adjustable collar 74 adjustably secured to but insulated from shaft $20^3$ (Fig. 3). These collars 74 are insulated from shaft $20^3$ by an insulating sleeve 77 and are insulated from each other by insulating washers 78. These metallic collars 74 and insulating collars 78 are preferably radially serrated at say, one degree spacing so that by loosening nut 79 each metallic collar 74 may be adjusted to the proper degree position required. In order to facilitate the adjustment of these brushes 11, 12 etc. accurately the support 70 may be removed after which the hollow shaft $20^3$ may be pulled off of the studs 71 and placed on the jig 72 shown in Fig. 4. This jig 72 is provided with a stud $72^a$ on which the hollow shaft $20^3$ may be placed as shown. By so placing the shaft $20^3$ on the stud $72^a$ that the pointer 73 points to the correct degree mark engraved on base 72 (not shown) and with the particular brush for that degree setting then being turned to point to the pedestal 76 the motor M will be operated thereafter to that degree position when the brush under consideration is energized. After all of the brushes have been so adjusted and the nut 79 tightened up the hollow shaft $20^3$ may be again assembled into the apparatus. There are preferably 3 studs 71 unequally spaced about the hub of stub-shaft $19^3$ and correspondingly spaced holes are provided in the flange of shaft $20^3$ so that the shaft $20^3$ can be assembled on stub-shaft $19^3$ in one way only. Both motors M and M10 may be provided with such contact mechanism. In all other respects the Fig. 3 structure is the same as the Fig. 1 construction.

Figure 5:
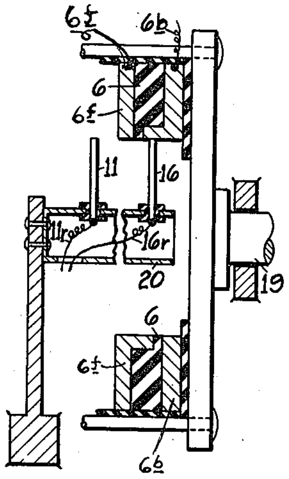
Fig. 5 illustrates another fragmentary portion of an apparatus embodying the invention in which the contact drums are adjustable and rotatable whereas the contact brushes are non-adjustable and stationary.

*Structure Fig. 5.*—Instead of holding the contact drums stationary and rotating the brushes by the stub-shaft $20^5$ as shown in Figs. 1 and 3, the brushes 11–16 may be held stationary and the contact drums 1–6 may be rotated by the stub-shaft $19^5$ as shown in Fig. 5. In all other respects the Fig. 5 structure is identical to that shown in Fig. 1, and certain like parts have been assigned like reference characters with distinctive exponents.

Figure 6:
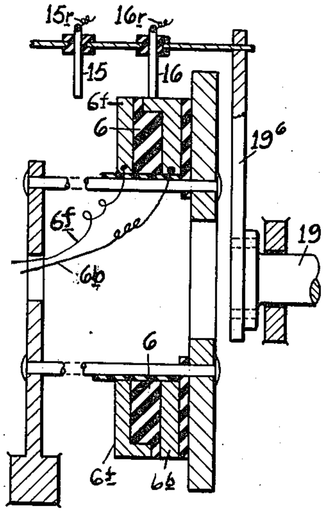
Fig. 6 illustrates a fragmentary portion of a modified form of the invention in which the rotatable contact brushes rotate on the exterior of adjustable drums whereas in Fig. 1 the rotatable brushes ride on the interior of adjustable contact drums.

*Structure Fig. 6.*—If the contact drums of Fig. 1 are reconstructed so that the contact bands are on the exterior of the drum as shown in Fig. 6 instead of on the interior as shown in Fig. 1 then a crank arm supporting brushes 11–16 driven by the stub-shaft $19^6$ may be provided to engage the exterior of these contact drums 1–6. Such a modified construction has been illustrated in Fig. 6. In all other respects the Fig. 6 modification is identical to the Fig. 1 construction and portions thereof have been designated by like reference characters having distinctive exponents.

Figure 7:
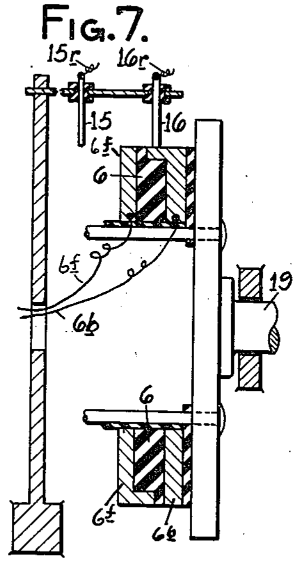
Fig. 7 illustrates a fragmentary portion of a modified form of the invention wherein the contact drums are rotatable and adjustable like in the Fig. 5 construction but wherein the fixed brushes contact with the exterior of the drums whereas in the Fig. 5 construction they contact with the interior surfaces.

*Structure Fig. 7.*—If desired, contact drums such as shown in Fig. 6 may be supported and driven by the stub-shaft $19^7$ in which case the brushes 11–16 may be held stationary by a suitable fixed brush holder. Such a modified construction has been illustrated in Fig. 7. In all other respects the modified construction shown in Fig. 7 is identical to the embodiment of the invention illustrated in Fig. 1 and portions thereof have been designated by like reference characters having distinctive exponents.

*Structure Fig. 8.*—If instead of having all of the exterior engaging brushes relatively fixed with respect to each other as illustrated in Figs. 6 and 7 these brushes may be made adjustable about the commutator by having each brush secured to a rotatably adjustable conducting ring 81, 82, 83, 84, 85 or 86 as shown in Fig. 8 then these brushes may all engage a single wide contact drum such as used in the Fig. 3 constructions (and see Fig. 2) except that the contacting surface would be on the exterior as shown in Figs. 6 and 7 instead of on the interior as shown in Fig. 2. Such a construction has been illustrated in Fig. 8. In this Fig. 8 construction the contact drum 90 is wide enough to accommodate all six brushes and may be rotated by shaft $19^8$ and the brushes 11–16 are held stationary as shown in each of Figs. 5 and 7. In this Fig. 8 construction the brushes 11–16 may be adjusted to the angular positions desired by rotating the rings 81–86 to the proper position between insulating washers 92 by worm driven worm-wheels such as shown in side elevation in Fig. 2 the thumb-head (not shown) of which is preferably accessible from the outside of a housing. In all other respects the Fig. 8 modification is the same as the Fig. 1 construction.

*Structure Fig. 9.*—Instead of using wipe contact drums and wipe contact brushes such as shown in Figs. 1, 3, 5, 6, 7 and 8 kissing contacts 101 operated by rollers 102 engaging cams 103 may be used to connect a control wire such as *11r, 12r, 13r, 14r, 15r* or *16r* to the forward wire *f* or the backward wire *b* as shown in Fig. 9. In this structure the cam 103, wide enough to accommodate six rollers 102, is secured to a shaft $20^9$. As shown the contact 101 having a lift roller 102 is supported in a ring $137^9$ having worm teeth and which is pivotally supported in any suitable way to rotate through an arc of 180°. The contacts *f* and *b* are also supported by this ring worm gear $137^9$ by insulating means not shown. By this construction the contact mechanism may be adjusted to stop the motor M or M10 at any desired position by adjusting worm $135^9$ turned by winged head $136^9$. In all other respects the modified construction of Fig. 9 is identical to the structure of Fig. 1. When roller 102 rides on the small radius portion of cam 103 the contacts 101–*b* are closed, when it rides on the large radius portion the contacts 101–*f* are closed and when it rides on the inclined portion of the cam both pairs of contacts are open.

*Operation.*—By referring to Fig. 1 it will be seen that the apparatus is assuming its push button 22 position, which we may call the station "2" position. In this position of the apparatus the contact 42 on push button 22 tunes the television set to the carrier frequency of a station 2 and the contact 32 applies current to the two brushes 12 for motors M and M10 respectively, the contact drum 2 starts the motor and stops the motor M when the antenna 120 points to station "2" and the motor M10 is stopped by the contact drum to which wire 12*t* is connected when the antenna 120 has been tuned to the carrier frequency of that station. It is of course understood from the foregoing description that the motors M and M10 may be either operated in the same directions or in opposite directions depending on whether the frequency of tuning of station "2" and the previous selected station are in the same order or in different order than the locations of these stations about the compass. That is in each case the motor M or M10 will operate in a direction to cause the contact brush to operate over the shortest distance to insulation 40 (see Fig. 2). Let us now refer to Figs. 2 and 10 and assume that the contact brush 12 engaged drum contact 2*f* when the push button 22 was depressed. In this case the motor M would have been operated forward and the shaft 20 would have been operated clock-wise as viewed in Fig. 2 and as viewed from the left in Fig. 1. This operating circuit may be traced in Fig. 1 by starting at the secondary winding of transformer T*r* wire 130, selecting switch 52, wire 131, push button contact 31, push button contact 32, wire *h*, wire 12*r* (and wire 12*t* for the antenna tuning apparatus including motor M10), brush 12, contact band 2*f* (see Figs. 2 and 10) wire *f*, winding F and condenser C in series with winding B and both in multiple with winding F, through common return wire 132 back to the secondary winding of transformer T*r*. This will cause the motor M to operate forward until the contact brush 12 (Fig. 2) opens the circuit by riding onto insulation 40. If under the conditions assumed the motor M10 also had its contact brush 12 on contact band 2*f* of the antenna tuning mechanism the motor M10 will also be operated forward but if it had its contact brush 12 on contact band 2*b* the motor M10 will be operated backward. In both structures the contact drums will have been so adjusted that the respective motors are stopped when the antenna 120 has been properly oriented and properly tuned for the particular station, namely station "2," to which such drums have been assigned. Each of the six drums of the two structures are each assigned to and adjusted to its particular station. When the control wire 12*t* (Fig. 1), for instance, is energized the motor M10 Fig. 1 will operate until brush 12 engages insulation 40. If now the turn button 136 is turned the brush 12 will follow the insulation 40 as it is rotated in one direction or the other. This may be continued until maximum reception is received by the receiving set from the station with which control wire 12*t* is associated, under which condition the contact drum is properly adjusted. The same procedure may then be followed with respect to each of the other contact drums of both motors when newly installed apparatus is adjusted for the particular locality where it has been installed.

The selecting switch 52 (Fig. 1) enables the push button control to be cut out and an adjusting switch 53 to be cut in so that slight shifting of the antenna, or its tuner, may be made for experimental purposes. If this switch is omitted, as it may be, only one control wire for each station, employing the Fig. 1 structure, plus one common return wire is required.

Having thus disclosed in drawings and described complete combination of antenna directing and tuning apparatus and having disclosed numerous fragmentary modifications of various forms of adjustable contact mechanisms which may be used in either the antenna rotating mechanism or the antenna tuning mechanism it should be understood that the embodiments illustrated have been selected to show how the invention may be carried out and to facilitate its description and it should be further understood that this does not exhaust all possible forms the invention may take and it should be understood that various additions, changes and modifications may be made without departing from the spirit or scope of the invention so long as these changes and additions come within the scope of the following claims.

What I claim as new is:

1. In combination, a high frequency radio receiver including tuning devices for tuning the receiver to any one of a plurality of television broadcasting station carrier frequencies, an antenna mast, a directional frequency adjustable antenna supported on said mast, electro-responsive means for orienting said mast and antenna and tuning said antenna by changing its physical dimensions, and manually operable means for tuning the tuning devices of said receiver to the carrier frequency of a particular broadcasting station and for controlling said electro-responsive means so as to tune said antenna to the carrier frequency of such broadcasting station and to orient said mast and antenna so that the antenna's axis of maximum reception points to such broadcasting station.

2. Remote controlled apparatus for operating a device located at an operating point located at a distance from the control point to any one of a plurality of different positions about an axis some of which positions are spaced more than 180° apart and ascertained and determined after the apparatus has been installed comprising; an operating mechanism including a reversible motor having a forward operating circuit and a reverse operating circuit and located at said operating point and when rendered active operating said device; a plurality of feed wires and a common return wire extending from the control point, to the operating point one feed wire for each position to which the device is to be operated; contact apparatus including one double throw make-after-break contact mechanism for each control wire and operated by said operating mechanism, each having its common contact connected to its control wire and having the selecting contact which is closed when the device assumes its most extreme reverse position connected to the forward operating circuit of said reversible motor and having the selecting contact which is closed when the device assumes it most extreme forward position connected to the reverse operating circuit of said reversible motor, said extreme forward position and said extreme reverse position of said device being substantially 360° apart and each of said contact mechanisms being adjustable and being so adjusted that each contact mechanism assumes the circuit-open position when said device assumes the position to which it is to be operated by energization of its associated control wire; whereby after the apparatus has been installed the plurality of contact mechanisms may each be adjusted to stop the motor when the device has been operated to the position assigned to that contact mechanism and control wire, and whereby when a particular control wire is energized the motor will be energized by the application of current to the proper operating circuit of the motor to cause the motor to operate in a direction within said 360° to reach that position at which time the selecting contact will assume the neutral open condition to stop the motor.

3. In combination, an ultra-high frequency radio receiver including tuning means for tuning the receiver to the carrier frequency of any one of a plurality of ultra-high frequency radio broadcasting stations, lead-in wires, a uni-directional antenna capable of efficient reception of radio waves from one direction about the compass only and electrically connected to said receiver through the medium of said lead-in wires, motor operated means including a reversible motor for orienting said antenna throughout substantially 360°, and manually operable means for operating said tuning means to tune said receiver to any one of said broadcasting station carrier frequencies and for controlling said reversible motor of said motor operated means to orient said antenna so that its axis of maximum reception points at such station and in a manner to confine the extent of rotation of said antenna to substantially a single rotation of said antenna so that said lead-in wires will not become twisted.

4. In combination, an ultra-high frequency radio receiving set including tuning means for tuning said receiving set to the carrier frequency of any one of a plurality of ultra-high frequency radio broadcasting stations, an antenna mast, an adjustably tunable antenna supported by said mast and electrically connected to said receiving set, motor operated means including a reversible motor for adjusting the tuned condition of said antenna and supported on said mast, and manually operatable means for operating said receiving set tuning means to tune said receiving set to any one of said broadcasting station carrier frequencies and for controlling said reversible motor of said motor operated means to tune said antenna to the same carrier frequency.

5. Remote controlled apparatus for operating a device located at an operating point located at a distance from the control point to any one of a plurality of different positions about an axis ascertained and determined after the apparatus has been installed comprising; an operating mechanism including a reversible motor having a forward operating circuit and a reverse operating circuit and located at said operating point when rendered active operating said device, a plurality of feed wires and a common return wire extending from the control point to the operating point one feed wire for each position to which the device is to be operated, contact apparatus including one double throw make-after-break contact mechanism for each control wire and each operated by said device and each having its common contact connected to its control wire and having the selecting contact which is closed when the device assumes its most extreme reverse position connected to the forward operating circuit of said reversible motor and having the selecting contact which is closed when the device assumes its most extreme forward position connected to the reverse operating circuit of said reversible motor said extreme forward position and said extreme reverse position of said device being spaced more than 180° and not in excess of 360° apart about said axis, adjustable means for each contact mechanism for adjusting such contact mechanism so that its common contact is out of contact with both of its selecting contacts at any one of various positions of said device for adjusting such contact mechanism to open its control circuits at a particular position of said device, whereby after the apparatus has been installed the plurality of contact mechanisms may each be adjusted to stop the motor when the device has been operated to the position assigned to that contact mechanism and its associated control wire and whereby when a particular control wire is energized the motor will be energized by the application of current to the proper operating circuit of the motor to cause the motor to operate said device in a direction within said 360° to reach that position whereupon the selecting contact will assume that neutral open condition to stop the motor.

6. Remote control apparatus for operating a member to any one of a plurality of specific positions determined after the apparatus has been installed comprising; gearing for operating said member; a reversible motor for operating said gearing and having a forward running circuit and reverse running circuit; one control wire for each of said specific positions; a source of current; a common return wire; a contact mechanism for each control wire for connecting such control wire to said forward circuit when said member assumes any position reverse of the specific position for such control wire, for connecting such control wire to said reverse circuit when said member assumes any position forward of the specific position for such control wire and disconnecting such control wire from both the forward and reverse circuit when said member assumes the specific position for such control wire; manually operable means for applying current through a partial circuit including said source and said common return wire to any one of said control wires; a housing means for housing said contact mechanisms; and means for each contact mechanism accessible from the outside of said housing means for adjusting such contact mechanism so as to disconnect such control wire from both the forward and reverse circuit when said member assumes any specific position.

7. High frequency radio receiving apparatus comprising, a radio receiver, tuning means in said receiver for tuning said receiver to any one of a plurality of broadcasting station carrier frequencies, a selecting contact for each broadcasting station closed when said tuning means is tuned to the carrier frequency of such station, an antenna mast, a tunable antenna which is directional in its optimum reception supported on said mast and connected to said receiver, remote controlled apparatus including a reversible motor controlled by said selecting contacts and constructed to orient said antenna so as to cause its axis of optimum reception to point to a particular broadcasting station when the selecting contact for that broadcasting station is closed, and other remote controlled apparatus supported on said mast and controlled by said selecting contacts for tuning said antenna to the carrier frequency of such particular broadcasting station when the same selecting contact assigned to that particular broadcasting station is closed.

8. Remote control apparatus for operating a member to any one of a plurality of specific positions determined after the apparatus has been installed comprising; gearing for operating said member; a reversible motor for operating said gearing and having a forward operating circuit and a reverse operating circuit; one control wire for each of said specific positions; adjustable contact apparatus operatively connected to said member and including one double throw make-after-break contact mechanism including a control contact, a forward contact and a backward contact for each control wire and operated by said member, each contact mechanism having its control contact connected by a flexible conductor to its associated control wire and having the forward contact which is engaged by said control contact when said member assumes the extreme reverse position connected by a flexible conductor to the forward circuit of said reversible motor and having the backward contact which is engaged by said control contact when said member assumes the extreme forward position connected by a flexible conductor to the reverse circuit of said reversible motor; said extreme forward position and said extreme reverse position of said member being substantially 360° apart about an axis; adjusting means for each contact mechanism for adjusting such contact mechanism after the remote control apparatus has been installed so that the control contact for such mechanism is out of contact with both the forward contact and the backward contact when said member assumes the position to which it is to be controlled by the corresponding control wire; whereby after the control apparatus has been installed each control mechanism may be selected for a particular control point to which such member is to be operated and then such mechanism may be adjusted so that if a particular control wire is energized said reversible motor will be operated in the proper direction to reach the control point for such mechanism and within the confine of said 360° and thereafter said reversible motor will be stopped when said member reaches such particular control point.

9. Remote control apparatus for operating a shaft to any one of a plurality of specific positions determined after such apparatus has been installed comprising; a reversible motor having a forward circuit and a reverse circuit; a shaft; a reduction gear train driven by said motor and driving said shaft; a plurality of contact mechanisms operatively associated with said shaft, each mechanism having a control contact, a forward contact connected to said forward circuit and a reverse contact connected to said reverse circuit; said control contacts each engaging said forward contact when said shaft assumes its extreme reverse position and engaging said reverse contact when said shaft assumes its extreme forward position and engaging neither of said contacts when said shaft assumes the said specific position for that contact mechanism; a casing for housing said contact mechanisms; adjusting means in said casing and operable from the exterior of said casing for individually adjusting said contact mechanisms with respect to said shaft so that each contact mechanism will hold both of the motor circuits open at the specific position of said shaft for such contact mechanism and different from the specific positions of the other contact mechanisms; a source of current; a control wire for each contact mechanism and connected to the control contact thereof; a common return wire connecting the common point of said forward circuit and said reverse circuit to said source; and control means at a remote point for connecting said source to any one of said control wires.

10. Remote control apparatus for operating a shaft to any one of a plurality of specific positions determined after such apparatus has been installed comprising; a reversible motor having a forward circuit and a reverse circuit; a shaft; a reduction gear train driven by said motor and driving said shaft; a plurality of contact mechanisms operatively associated with said shaft, each mechanism having a control contact, a forward contact connected to said forward circuit and a reverse contact connected to said reverse circuit; said control contacts each engaging said forward contact when said shaft assumes its extreme reverse position and engaging said reverse contact when said shaft assumes its extreme forward position and engaging neither of said contacts when said shaft assumes the said specific position for that contact mechanism; a casing for housing said contact mechanisms; adjusting means in said casing and operable from the exterior of said casing for individually adjusting said contact mechanisms with respect to said shaft so that each contact mechanism will hold both of the motor circuits open at the specific position of said shaft for such contact mechanism and different from the specific positions of the other contact mechanisms; a source of current; a control wire for each contact mechanism and connected to the control contact thereof; a common return wire connecting the common point of said forward circuit and said reverse circuit to said source; and interlocked contact means located at a point remote from said apparatus for connecting one and only one of said control wires to said source at any one time.

11. Remote control apparatus comprising; a casing; a shaft in said casing; reduction gearing for driving said shaft; a reversible motor having a forward circuit for operating said motor forward and a reverse circuit for operating said motor in a reverse direction for driving said reduction gearing; a plurality of contact mechanisms in said casing and operatively connected to said shaft; a control wire for each contact mechanism; each of said contact mechanisms connecting its associated control wire to said forward circuit when said shaft assumes any position between its extreme reverse position and a selected intermediate position, connecting said control wire to said reverse circuit when said shaft assumes any position between its extreme forward position and such selected intermediate position and at which selected position said control wire is disconnected from both said forward and said reverse circuit; a worm wheel and worm mechanism for each contact mechanism in said casing for adjusting such contact mechanism to any specific selected intermediate position; an operating member for each worm and each extending through the wall of said casing for operating such worm from the outside of said casing to adjust such mechanism to select any specific selected intermediate position; and means at a remote point for energizing said control wires only one at any one time.

12. Radio receiving apparatus comprising; a radio receiver including tuning mechanism for tuning said receiver to any one of a plurality of carrier frequencies and having a selecting contact for each frequency; an antenna mast; gearing for rotating said mast; a first motor for operating said gearing; a tunable directional antenna supported by said mast; a gear train for tuning said antenna to any one of said plurality of carrier frequencies and supported by said mast, a second motor supported on said mast and for operating said gear train supported by said mast, a single control wire for each of said plurality of carrier frequencies extending to both of said motors, and contact mechanism for each of said plurality of carrier frequencies for each of said motors and each contact mechanism being controlled by its associated motor and being energized by a selecting contact of said tuning mechanism through the medium of said control wires for controlling said motors to rotate said mast to a point about the compass to cause said antenna to point its axis of reception to the radio transmitting station to which said radio receiver is tuned and to tune said antenna to the same carrier frequency as that to which said tuning mechanism is tuned.

13. Radio receiving apparatus comprising; a rotatable antenna mast which may be rotated about the points of the compass, a first shaft for rotating said mast; a first gear train for operating said shaft; a first reversible motor having a forward circuit and a reverse circuit and for driving said first gear train; a first casing for housing said first shaft; a tunable directional antenna supported on said mast; a second shaft for tuning said antenna; a second casing supported by said mast for housing said second shaft; a second gear train supported by said mast for driving said second shaft; a second reversible motor supported by said mast and having a forward circuit and a reverse circuit and for driving said second gear train; a radio receiver connected to said antenna and having tuning means to tune said receiver to any one of a plurality of broadcasting transmitting stations; two contact mechanisms for each of said transmitting stations one located in said first casing and operatively and adjustably connected to said first shaft and the other located in said second casing and operatively and adjustably connected to said second shaft for controlling said first motor and said second motor respectively; each contact mechanism when properly adjusted being controlled jointly by its associated shaft and the tuning means of said receiver so that if said receiver is tuned to a particular transmitting station said first motor will through the medium of its forward circuit or its reverse circuit as required, said first gear train, said first shaft and said mast rotate said antenna so that its axis of reception points to said particular transmitting station, and said second motor through the medium of its forward circuit or its reverse circuit as required, said second gear train and said second shaft will tune said antenna to the carrier frequency of said particular transmitting station; and means accessible from the outside of each of said casings for adjusting each contact mechanism in such casing independently so that in each case when said tuning means is changed to tune said radio receiver to a different transmitting station said antenna will be oriented by said first motor so its axis of reception will point to such station and will be tuned by said second motor to the carrier frequency of such station by said second motor.

14. Radio receiving apparatus comprising; a radio receiver having tuning means to tune it to any one of a plurality of broadcasting stations having different carrier frequencies, a mast, an antenna which may be tuned to any one of said carrier frequencies and supported on said mast and connected to said receiver, a casing, a shaft in said casing, a reduction gear train for driving said shaft, a reversible motor having a forward circuit for operating said motor forward and a reverse circuit for operating said motor in the reverse direction for driving said reduction gear train; a plurality of contact mechanisms one for each of said broadcasing stations in said casing and operatively connected to said shaft, a control wire for each contact mechanism, each of said contact mechanisms connecting its associated control wire to said forward circuit when said shaft assumes any position between its extreme reverse position and a selected intermediate position, connecting said control wire to said reverse circuit when said shaft assumes any position between its extreme forward position and such selected intermediate position and for disconnecting said control wire from both said forward circuit and said reverse circuit when said shaft assumes said selected intermediate position, means associated with said tuning means to energize a particular and different control wire for each broadcasting station when such tuning means is tuned to the carrier frequency of such broadcasting station, a worm-wheel and worm mechanism for each contact mechanism and housed in said casing for adjusting said contact mechanism to any specific selected intermediate position, an operating member for each worm extending through the wall of said casing for operating such worm from the outside of such casing to adjust such mechanism to select the proper specific intermediate position to cause said motor to stop when the control wire for such contact mechanism has been energized by said tuning means when such tuning means is tuned to a particular broadcasting station to orient said antenna so as to point its axis of reception to such broadcasting station; and a second shaft housed in a second housing supported on said mast and operated by a second reversible motor through the medium of a second gear train to tune said antenna and controlled by contact mechanism for each station and adjustable from the exterior of said second casing and connected to the control wire for such station of similar construction as that specified above for tuning said antenna; each contact mechanism being adjusted so that if said tuning means is tuned to the carrier frequency of a particular broadcasting station to energize a particular control wire common to both motors, said second motor through the medium of the second contact mechanism for that station will cause said second motor to operate in the proper direction and to the proper extent to tune said antenna to the carrier frequency of such station through the medium of said second gear train and second shaft; whereby if the tuning means of said receiver is tuned to the carrier frequency of a particular station the two motors will be operated over the same control wire to cause said antenna to be tuned to the same carrier frequency as said tuning means is tuned and to cause said mast to be oriented to cause the axis of reception of said antenna to point to such particular broadcasting station.

15. In combination, an ultra-high frequency radio receiver including tuning means for tuning said receiver to the carrier frequency of any one of a plurality of ultra-high frequency radio broadcasting stations, lead-in wires, a directional antenna mounted for rotation about a substantially vertical axis through substantially 360° and connected to said receiver through the medium of said lead-in wires, one control wire for each broadcasting station, a reversible motor having a forward operating circuit and a reverse operating circuit for operating said motor forwardly and backwardly respectively, circuit controlling means for each broadcasting station each for connecting its associated control wire to said reverse circuit when said antenna assumes any position between the selected position for its station and its extreme forward position and for connecting its associated control wire to said forward circuit when said antenna assumes any position between the selected position for its station and its extreme reverse position and for disconnecting such control wire from both said forward and said reverse circuit when said antenna assumes the selected position for that station when its axis of reception points to the broadcasting station assigned to that control wire, and means for adjusting said circuit controlling means for each station so that the degrees of rotation of said antenna between one extreme position and the selected position may be increased and the degrees of rotation of said antenna between the other extreme position and the selected position may be decreased without changing the location of either extreme position, whereby any control wire and its associated circuit controlling means may be assigned to any broadcasting station by proper adjustment of its circuit controlling means, and contacts associated with the tuning means of said receiver for applying electrical energy to a control wire for a particular broadcasting station when said receiver is tuned to that station, whereby the rotation of said antenna is confined within 360° of rotation and said lead-in wires will not become twisted.

16. In combination, an ultra-high frequency radio receiver including tuning means for tuning the receiver to the carrier frequency of any one of a plurality of radio broadcasting stations, lead-in wires, a uni-directional antenna mounted for rotation about a substantially vertical axis and connected to said receiver through the medium of said lead-in wires, one circuit controlling means for each of said broadcasting stations, a driving connection between said antenna and said plurality of circuit controlling means including reduction gearing, a reversible motor for driving said antenna and said circuit controlling means, and manually operable means for operating said tuning means to tune said receiver to any one of said broadcasting station carrier frequencies and for controlling said motor through the medium of said circuit controlling means to orient said antenna so that its axis of maximum reception points to that station.

OSCAR H. DICKE.

REFERENCES CITED

The following references are of record in the file of this patent:

UNITED STATES PATENTS

| Number | Name | Date |
|---|---|---|
| 2,264,850 | Koch | Dec. 2, 1941 |
| 2,272,431 | Rankin | Feb. 10, 1942 |
| 2,292,791 | Mims | Aug. 11, 1942 |
| 2,476,469 | Walker | July 19, 1949 |
| 2,481,331 | Newbold | Sept. 6. 1949 |